United States Patent
Saini et al.

(10) Patent No.: US 12,463,943 B2
(45) Date of Patent: Nov. 4, 2025

(54) SECURE REMOTE ACCESS FOR DEVICES USING PRIVATE CELLULAR CONNECTIONS

(71) Applicant: Cisco Technology, Inc., San Jose, CA (US)

(72) Inventors: Vinay Saini, Bangalore (IN); Snezana Mitrovic, Leefdaal (BE); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 17/976,308

(22) Filed: Oct. 28, 2022

(65) Prior Publication Data
US 2024/0146697 A1 May 2, 2024

(51) Int. Cl.
*H04L 29/06* (2006.01)
*H04L 9/40* (2022.01)
*H04W 12/062* (2021.01)
*H04W 24/04* (2009.01)

(52) U.S. Cl.
CPC ....... *H04L 63/0272* (2013.01); *H04W 12/062* (2021.01); *H04W 24/04* (2013.01)

(58) Field of Classification Search
CPC .. H04L 63/0272; H04W 12/062; H04W 24/04
See application file for complete search history.

(56) References Cited

U.S. PATENT DOCUMENTS

| | | | |
|---|---|---|---|
| 10,785,652 B1* | 9/2020 | Ravindranath | H04W 12/48 |
| 11,271,767 B2 | 3/2022 | Chen et al. | |
| 2003/0055990 A1* | 3/2003 | Cheline | H04L 63/0272 709/229 |
| 2020/0351351 A1 | 11/2020 | Hu et al. | |
| 2021/0136569 A1* | 5/2021 | Obaidi | H04W 12/37 |
| 2023/0232236 A1* | 7/2023 | Balmakhtar | H04L 63/0209 455/411 |
| 2024/0224099 A1* | 7/2024 | Dhamija | H04L 43/20 |

FOREIGN PATENT DOCUMENTS

| | | |
|---|---|---|
| CN | 114143343 A | 3/2022 |
| KR | 102242676 B1 | 4/2021 |

OTHER PUBLICATIONS

"Dedicated Remote Access with SINEMA Remote Connect." Siemens, Aug. 2022, Security: DDA, Article ID 109765714, V2.0, https://support.industry.siemens.com/cs/attachments/109765714/109765714_DDA_SINEMA_RC_V2_en.pdf . (Year: 2022).*

(Continued)

*Primary Examiner* — Malcolm Cribbs
(74) *Attorney, Agent, or Firm* — Lee & Hayes, P.C.

(57) ABSTRACT

In one embodiment, a device receives a request from a client to remotely access an endpoint in a local network. The device instantiates a network slice having a remote access function in a cellular network. The device causes the endpoint to communicate a particular type of traffic via the network slice and the remote access function. The device configures a virtual private network tunnel between the client and the remote access function. The client and endpoint communicate with one another via a connection that comprises the network slice and the virtual private network tunnel.

18 Claims, 7 Drawing Sheets

(56) References Cited

OTHER PUBLICATIONS

Rotmensen, Sander, "Secure Remote Access via Public 5G Network", online: https://ingenuity.siemens.com/2020/12/secure-remote-access-via-public-5g-network/, Dec. 8, 2020, accessed Oct. 27, 2022, 6 pages, Siemens.com.
Kulczycki, Marcin, "IoT Hacking Series #11: How do VPN, APN and Fixed IP SIM work?", online: https://1ot.com/resources/blog/vpn-apn-fixed-ip, Mar. 19, 2020, accessed Oct. 27, 2022, 6 pages, 1ot.com.
Stewart, et al., "Secured Enterprise Anchored 5G Core User Plane Function", Defensive Publications Series, Oct. 17, 2018, 6 pages, Technical Disclosure Commons.
Srivastava, et al., "Proxy Edge Function for Cloud Based 5G Core", Defensive Publications Series, Sep. 2020, 5 pages, Technical Disclosure Commons.
Milenkovic, et al., "Security in 5G Specifications—Controls in 3GPP Security Specifications (5G SA)", Feb. 2021, 49 pages, European Union Agency for Cybersecurity (ENISA).
"What is the 5G User Plane Function (UPF)?", online: https://www.metaswitch.com/knowledge-center/reference/what-is-the-5g-user-plane-function-upf, accessed Sep. 26, 2022, 3 pages, Metaswitch.
"5G Network Slicing—What is network slicing in 5G?", online: https://www.viavisolutions.com/en-us/5g-network-slicing, accessed Oct. 27, 2022, 8 pages, VIAVI Solutions Inc.
"3rd Generation Partnership Project; Technical Specification Group Services and System Aspects; System architecture for the 5G System (5GS)", Stage 2, Release 17, Sep. 2019, 26 pages, 3GPP, France.

* cited by examiner

SECURE REMOTE ACCESS FOR DEVICES USING PRIVATE CELLULAR CONNECTIONS

TECHNICAL FIELD

The present disclosure relates generally to computer networks, and, more particularly, to secure remote access for devices using private cellular connections.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another, such as an IoT motion sensor communicating with a smart lightbulb, to turn the lights on when a person enters a room. The IoT has also expanded to industrial settings as part of the so-called "Industrial IoT" (IIoT) to control manufacturing processes and other operations in industrial settings (e.g., factories, mines, oil rigs, etc.).

As devices are increasingly added to the IoT and IIoT, the number of external users and services that require access to them has also increased. For instance, a remote technician may wish to connect to a particular IoT device so that they can perform maintenance on it (e.g., updating its firmware, running diagnostics, etc.). However, simply allowing an endpoint device to access the Internet can also present a security risk. Indeed, unfettered access could lead to a malicious, external actor infecting an endpoint device for purposes of causing physical damage (e.g., controlling a motor outside of its safe operating range, etc.), exfiltrating data, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives a request from a client to remotely access an endpoint in a local network. The device instantiates a network slice having a remote access function in a cellular network. The device causes the endpoint to communicate a particular type of traffic via the network slice and the remote access function. The device configures a virtual private network tunnel between the client and the remote access function. The client and endpoint communicate with one another via a connection that comprises the network slice and the virtual private network tunnel.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
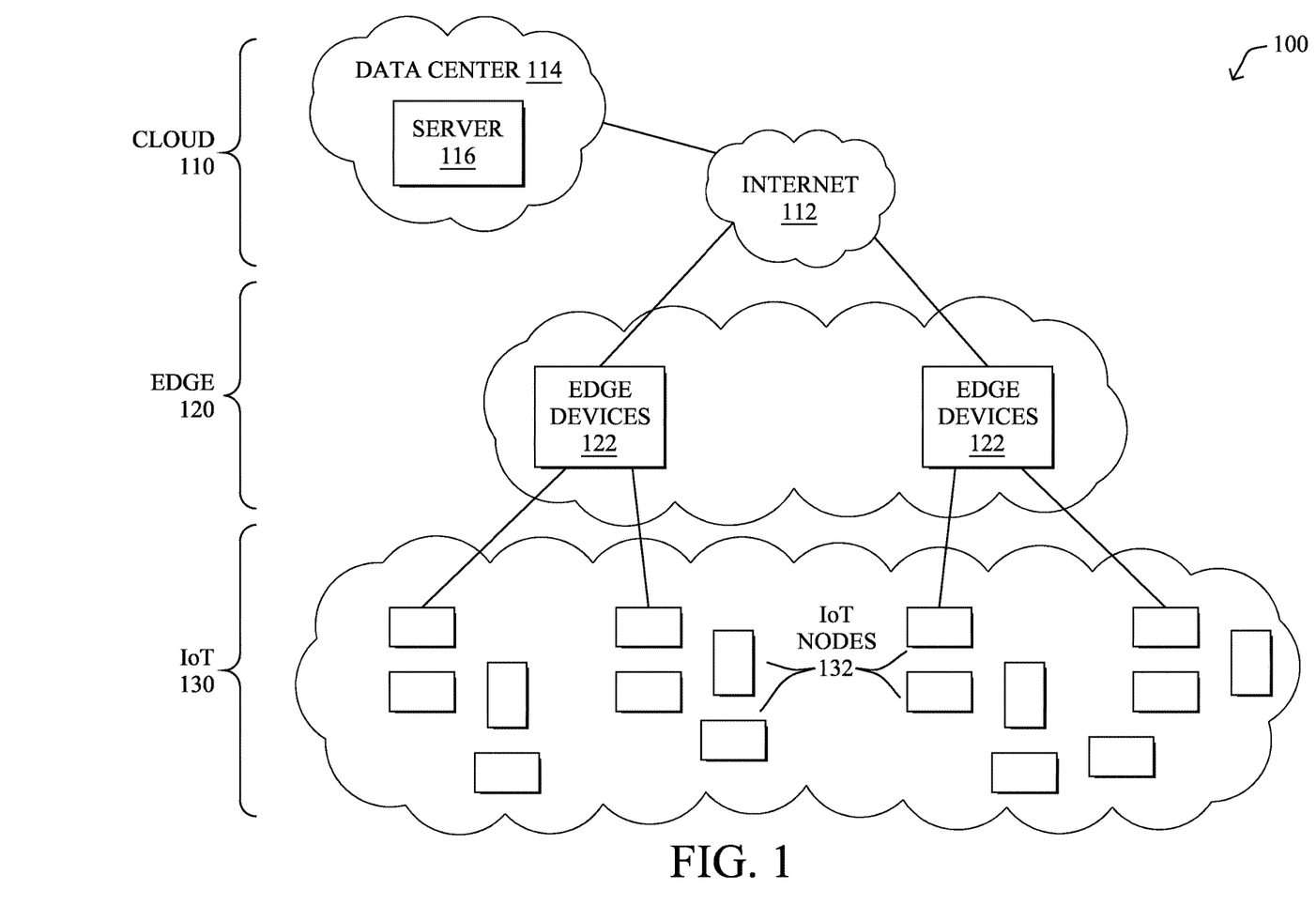
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
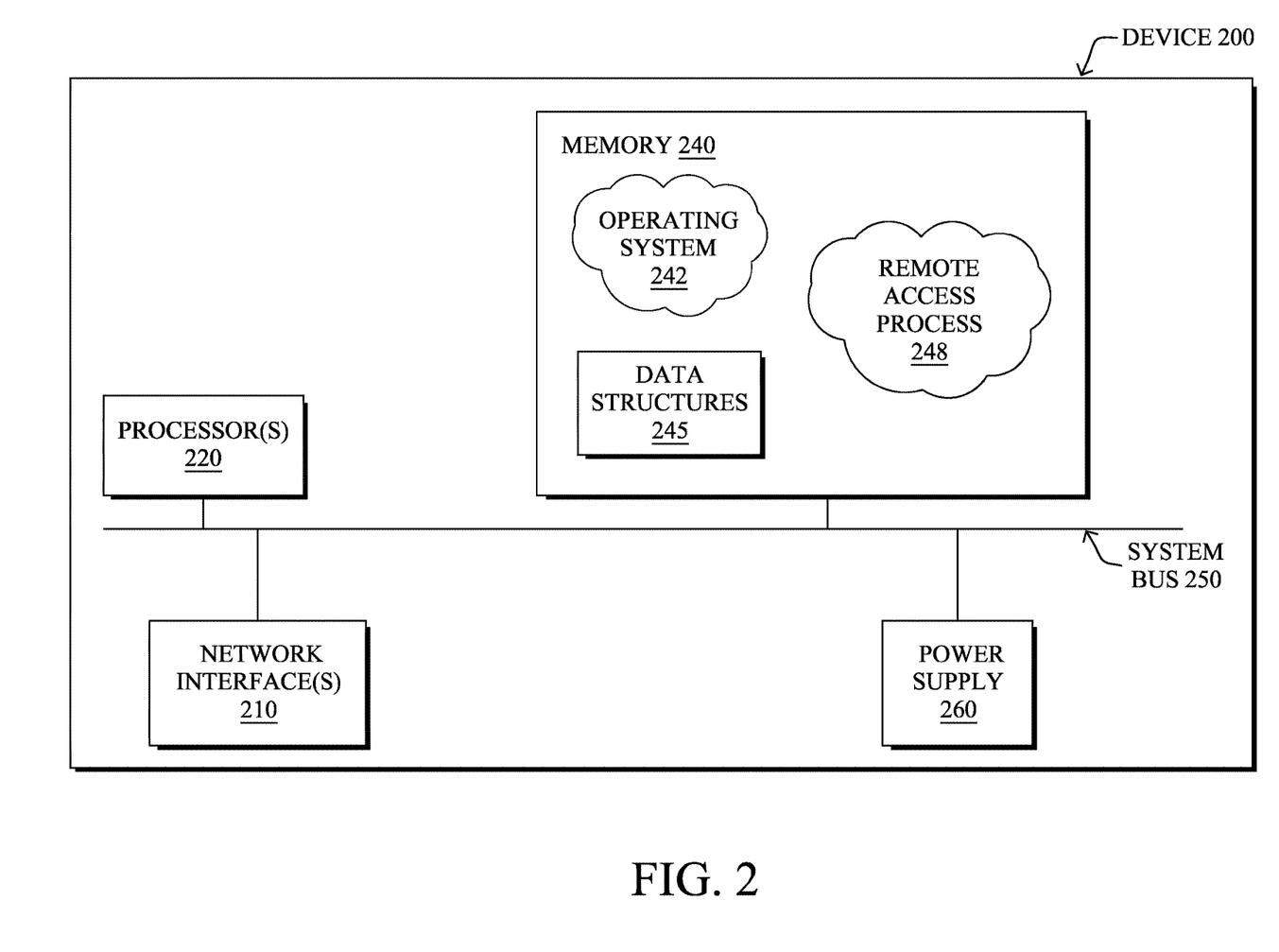
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative remote access process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Many industrial IoT (IIoT)/operations technology (OT) networks are now deployed using a 'cookie-cutter' approach whereby discrete manufacturing or other control segments are deployed using duplicate IP addresses. In other words, the network may comprise a plurality of units, such as cells, zones, bays, etc., with addresses being repeated across units. As a result, different devices may belong to overlapping subnets. In addition, these devices may be located behind one or more firewalls and/or network address translation (NAT) devices.

Figure 3:
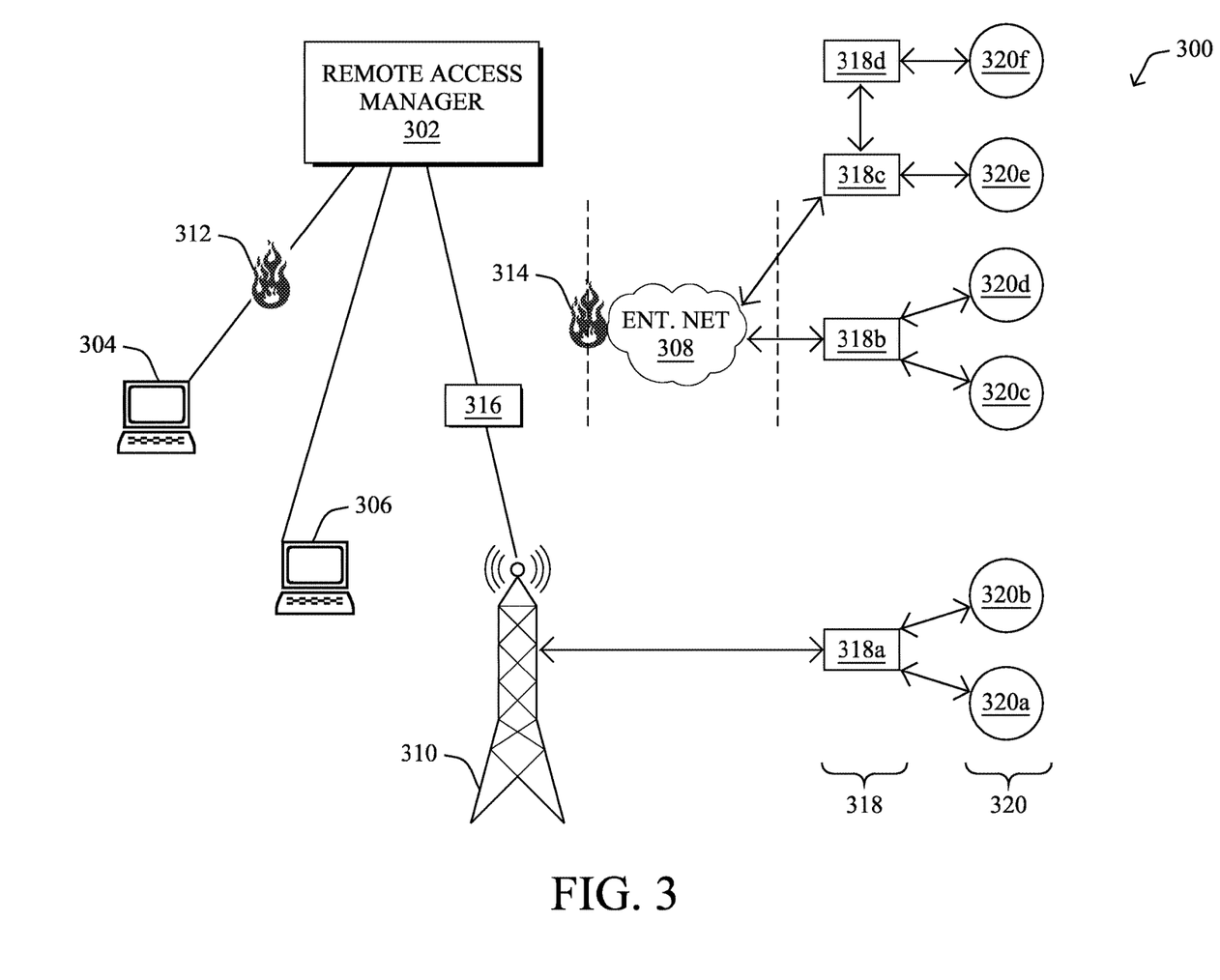
FIG. 3 illustrates an example of a remote access manager configuring remote access to an endpoint in a network.

By way of example, FIG. 3 illustrates an example 300 of a remote access manager 302 (e.g., a device 200) being used to configure remote access to an endpoint device in a network, according to various embodiments. As shown, assume that there are various endpoints 320 (e.g., IIoT devices) that are on a local network of a particular location, such as a factory, warehouse, or the like. In addition, assume that any or all of endpoints 320 each execute their own web application servers, allowing a technician to perform various functions such as reviewing diagnostic information, making configuration changes, and the like.

For instance, endpoints 320a-320b may be behind gateway 318a, which utilizes a cellular connection with a cell tower 310 and is behind NAT 316. Endpoints 320c-320d are behind gateway 318b, which is connected to an enterprise network 308 and behind a firewall 314. Likewise, endpoint 320f is behind gateway 318d. Gateway 318d and endpoint 320e are both behind gateway 318c, which is also connected to enterprise network 308 and behind firewall 314.

Remotely accessing the application web server of a particular endpoint 320 is quite challenging under normal circumstances. For instance, assume that the user of client 304 wishes to access the web server of endpoint 320b. To enable such a connection, a remote access manager 302 may configure the various networking devices between client 304 and endpoint 320b, according to various embodiments. Typically, this is done by configuring backdoor access to the specific endpoint 320 and a virtual private network (VPN) connection between client 304 and that endpoint 320. However, the operational overhead in configuring VPN connections and creating rules to access the different endpoints 320 by the myriad of external/remote clients can be quite cumbersome for network administrators. This burden will only continue to grow as the number of IoT/IIoT devices and manufacturers also increases.

Secure Remote Access for Devices Using Private Cellular Connections

The techniques introduced herein leverage cellular technologies introduced in the 5G cellular architecture, to establish secure, remote access connections to endpoint devices in a local network. More specifically, 5G advanced antenna systems (AAS)/private 5G (P5G) introduce new technologies, such as network slicing that can be used to divide the physical network into multiple logical networks with different network characteristics. In some aspects, the techniques herein can be used to automatically configure a network slice that only allows a traffic path between a particular endpoint device in a local network and an external/remote client (e.g., a service or device associated with the vendor of the endpoint device, etc.).

Illustratively, the techniques described herein may be performed by hardware, software, and/or firmware, such as in accordance with remote access process 248, which may include computer executable instructions executed by the processor 220 (or independent processor of interfaces 210) to perform functions relating to the techniques described herein.

Specifically, in various embodiments, a device receives a request from a client to remotely access an endpoint in a local network. The device instantiates a network slice having a remote access function in a cellular network. The device causes the endpoint to communicate a particular type of traffic via the network slice and the remote access function. The device configures a virtual private network tunnel between the client and the remote access function. The client and endpoint communicate with one another via a connection that comprises the network slice and the virtual private network tunnel.

Operationally, the techniques herein leverage the concept of network slicing, which is a technology recently introduced in the 5G cellular architecture. As would be appreciated, network slicing divides the physical network into multiple, logical networks (i.e., 'slices') that typically have different network characteristics. For instance, one slice may be specifically devoted to conveying public safety messages and its traffic given the highest priority, another slice may be devoted to conveying traffic to and from autonomous vehicles, etc.

Figure 4:
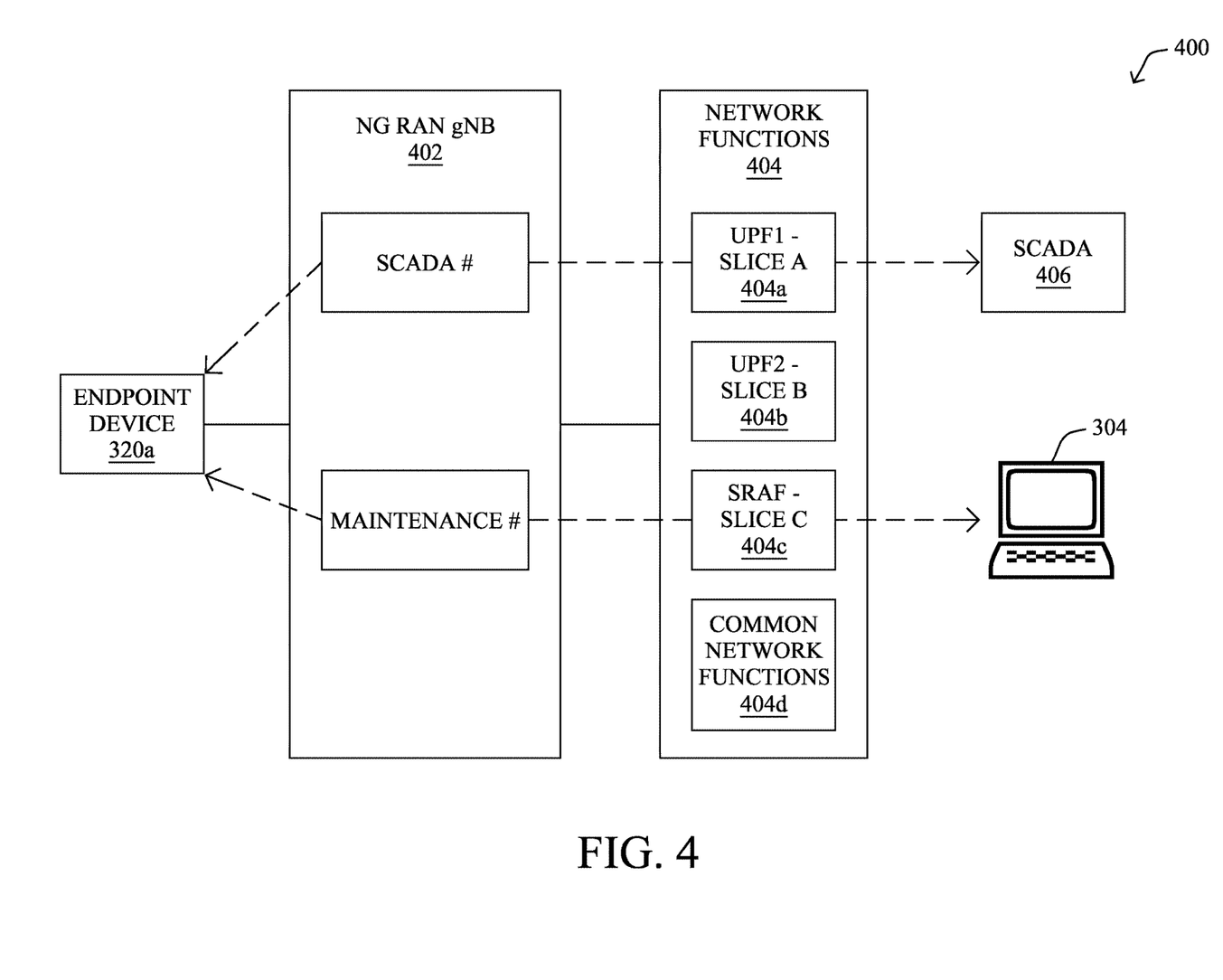
FIG. 4 illustrates an example of configuring a network slice for remote access to an endpoint.

In addition to network slicing, the 5G architecture also introduces the concept of user plane functions (UPFs), which serve to separate the control plane and user/data plane of the network. In general, a UPF may perform any or all of the following:

Provide an interconnect between the radio access network (RAN) and the data network
Inspect packets and detect their associated applications
Perform data forwarding and routing
Manage Quality of Service (QoS) for the traffic FIG. 4 illustrates an example 400 of configuring a network slice for remote access to an endpoint, according to various embodiments. As shown, assume that there is an endpoint 320a in a local network, such as an actuator, sensor, programmable logic controller (PLC) or other controller for an actuator or sensor, or the like, for which remote access is desired. In various embodiments, endpoint 320a may include one or more radio transceivers that allow it to communicate with a radio access network (RAN), such as a via Node B (gNB) 402 of a Next Generation (NG) RAN, which serves as a wireless base station for endpoint 320a.

In accordance with the 5G architecture, there may be a plurality of network functions 404 that are associated with different network slices of the network. For instance, network functions 404 may include UPF 404a associated with a first slice A, UPF 404b associated with a second slice B, etc., as well as common network functions 404d. In various embodiments, network functions 404 may also include secure remote access function (SRAF) 404d that is part of a dedicated slice C (e.g., used only to communicate data between endpoint 320a and a remote/external client).

As would be appreciated, network functions 404 and their various slices may be configured to convey different types of traffic to and from endpoint 320a. For instance, endpoint 320 may send and/or receive supervisory control and data acquisition (SCADA) traffic to/from a SCADA service 406 via UPF 404a.

SRAF 404c and its corresponding network slice may operate in a similar manner as that of UPF 404a in that it is also configured to forward a particular type of traffic to/from endpoint 320a, such as maintenance data. Unlike a traditional UPF, however, SRAF 404c may also be configured with additional call flows to allow a supervisory service (e.g., a device 200) to establish a secure communication channel with a specific endpoint, such as client 304, or set of endpoints for remote access. For instance, client 304 may be operated by a manufacturer, vendor, operator, etc. of endpoint 320a.

Figure 5A:
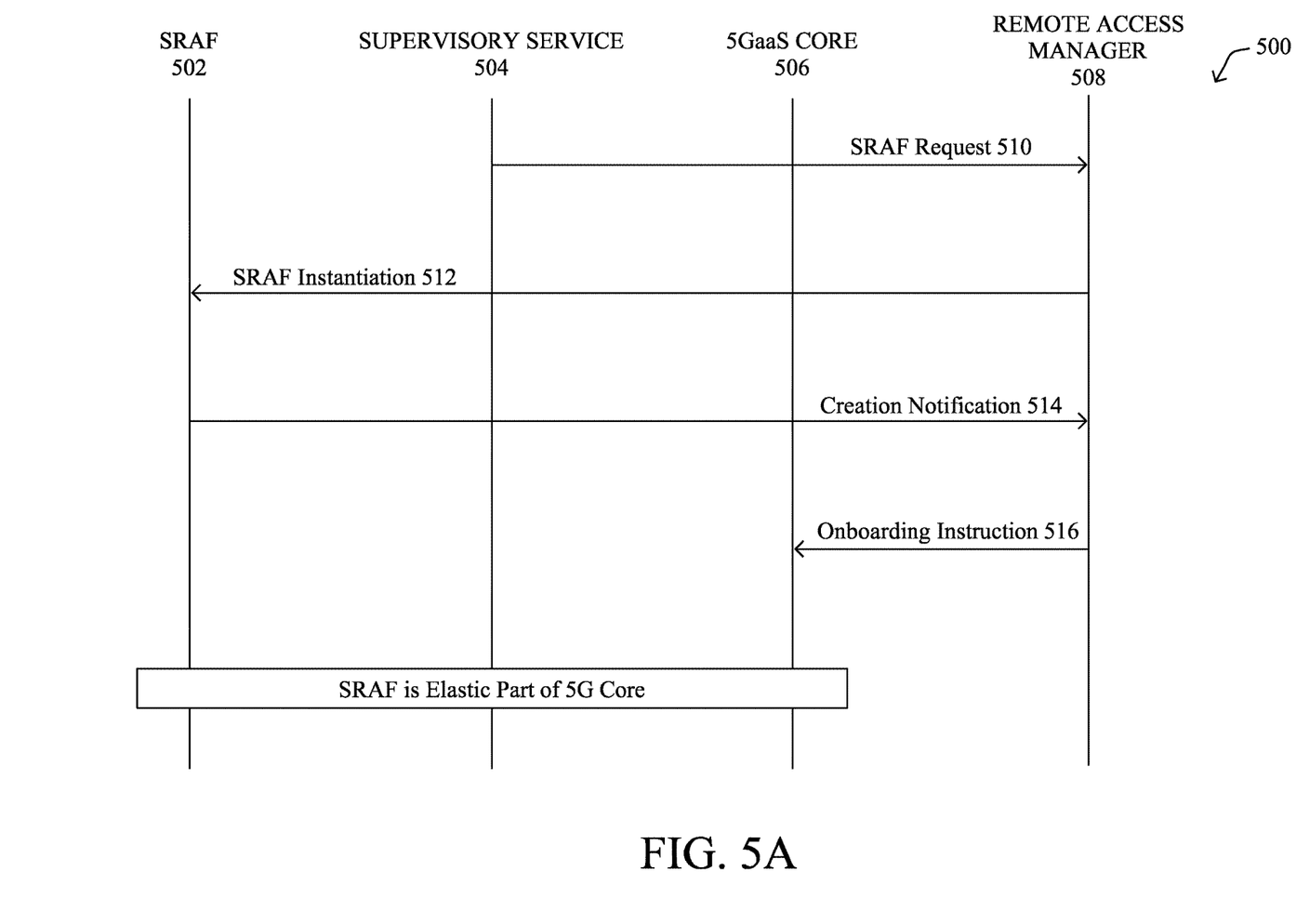
FIGS. 5A-5B illustrate example diagrams of the configuration of a remote connection between a client and an endpoint.
Figure 5B:
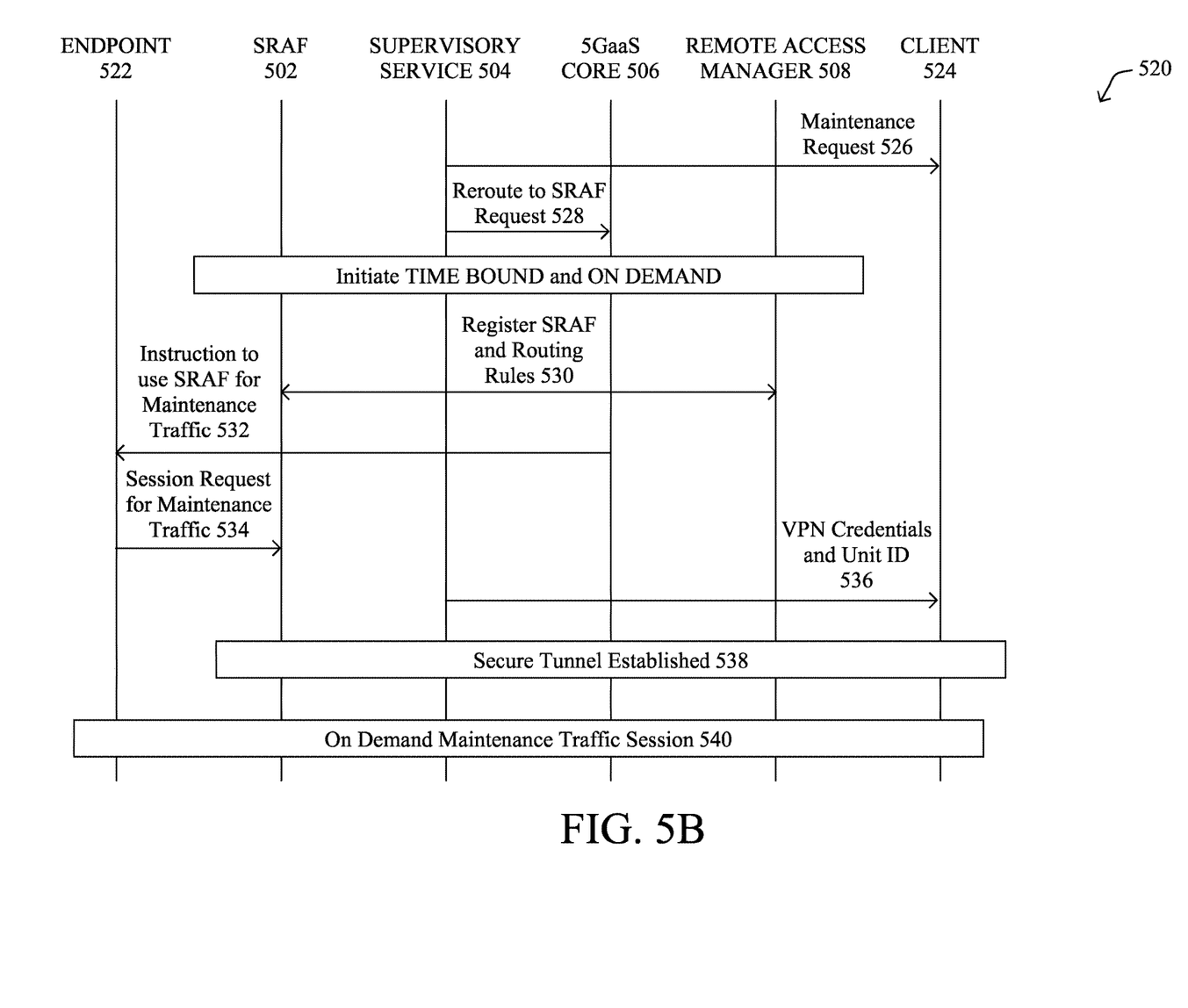

FIGS. 5A-5B illustrate example diagrams of the configuration of a remote connection between a client and an endpoint, according to various embodiments. More specifically, FIG. 5A illustrates a diagram 500 of the instantiation of a SRAF 502, in some embodiments. Similarly, FIG. 5B illustrates a diagram 520 of the establishment of a secure connection between an endpoint and an external/remote client using SRA 502.

As shown in FIG. 5A, a supervisory service 504 may oversee the various endpoint assets in a local network (e.g., endpoints 320 described previously) and operate in conjunction with a remote access manager 508, to establish secure connections between those assets and external/remote clients. Note that while supervisory service 504 and remote access manager 508 are shown as separate services, their functionalities can also be integrated into one another as part of a singular service or a larger plurality of services. Further, while supervisory service 504 and remote access manager 508 may be implemented by one or more devices (e.g., a device 200), the collection of such devices may be viewed as a singular device for purposes of implementing the techniques herein.

In general, supervisory service 504 may maintain information pertaining to the various vendors or manufacturers of the IoT assets in any number of local networks (e.g., factories, schools, office buildings, etc.), as well as identification information for the various endpoint assets. Such information may be obtained, for instance, by an asset inventory service or packet inspection service (e.g., Cisco Cybervision) and shared with supervisory service 504. In some embodiments, supervisory service 504 may also allow privileged users to establish secure, remote connections between any given endpoint and an external/remote client. For instance, a maintenance manager may log into supervisory service 504 and create a request to establish a remote access connection between a particular endpoint and a client operated by its vendor. In other embodiments, supervisory service 504 may autonomously establish a secure, remote connection, such as in response to an alert, at scheduled times, or the like.

Instantiation of SRAF 502 may begin by supervisory service 504 sending a SRAF request 510 to remote access manager 508. In various embodiments, SRAF request 510 may include the information needed by the 5G-as-a-service (5GaaS) core 506. For instance, SRAF request 510 may include an identifier for the endpoint for which remote access is being provided (e.g., its IMSI, etc.), an indication of the type of traffic/data to be handled by the instantiated SRAF 502 and its corresponding slice, or the like. In response, remote access manager 508 may perform the instantiation 512 in accordance with the parameters of SRAF request 510.

Once instantiated, SRAF 502 may send a creation notification 514 back to remote access manager 508. In turn, remote access manager 508 may send onboarding instructions 516 to 5GaaS core 506, thereby making SRAF 502 an elastic part of the 5G core network.

As shown in FIG. 5B, to form the secure connection between an endpoint 522 and a remote/external client 524 using SRAF 502 and its corresponding network slice, supervisory service 504 may send a notification 526 to external client 524 requesting maintenance or other operation over a remote connection. For instance, notification 526 may request that the user of client 524 review an alert raised by endpoint 522, perform a software upgrade of endpoint 522, reconfigure endpoint 522, or the like.

To ensure that the specific type of traffic to/from endpoint 522, such as maintenance traffic, is sent through SRAF 502 and its network slice, supervisory service 504 may then send a reroute request 528 to 5GaaS core 506. This may be performed on-demand and may also, in some embodiments, include a timeout parameter that limits the duration of the rerouting and/or any secure connection that traverses SRAF 502. In turn, a registration 530 may be performed across the 5GaaS core 506, SRAF 502, supervisory service 504, and/or remote access manager 508, to register SRAF 502 as a forwarding plane for endpoint 522 and the routing rules governing its operations.

Once SRAF 502 has been registered for use by endpoint 522, the 5GaaS core 506 may send an instruction 532 to endpoint 522, thereby configuring it to send all of its maintenance traffic to SRAF 502. In turn, endpoint 522 may send a session request 534 to SRAF 502 for its maintenance traffic.

In various embodiments, to complete the secure connection between endpoint 522 and external client 524, supervisory service 504 may also establish a virtual private network (VPN) tunnel between client 524 and SRAF 502. To do so, supervisory service 504 may send a message 536 that includes VPN credentials and unit ID to client 524. This allows external client 524 to establish a secure VPN tunnel 538 between itself and SRAF 502.

In various embodiments, once endpoint 522 has been configured to send certain traffic to SRAF 502 and VPN tunnel 538 has been established between SRAF 502 and external client 524, endpoint 522 and external client 524 may perform a communication session 540 between one another. For instance, in the case of maintenance of endpoint 522, endpoint 522 may send maintenance data via SRAF 502 (and its corresponding network slice) and VPN tunnel 538 to external client 524. In turn, external client 524 may perform maintenance on endpoint 522 by sending instructions, etc., back to endpoint 522 in the opposite direction.

In some embodiments, the connection between endpoint 522 and external client 524 may also be of a limited duration, according to a set parameter (e.g., an hour, a day, etc.). Once that time expires, supervisory service 504 may remove the configuration for SRAF 502 and its corresponding network slice from 5GaaS core 506.

In summary, the techniques provide for the instantiation of a custom SRAF in a 5G (or later) cellular network that allows for a VPN termination, to facilitate a remote connection between an endpoint and a remote client. In further aspects, a supervisory service may interact with the 5G core to establish such remote connections on the fly. In addition, the techniques herein also introduce new call flows for instantiating the SRAF and enable communications between the SRAF and access and mobility functions (AMF)/session management functions (SMF) of the network.

Figure 6:
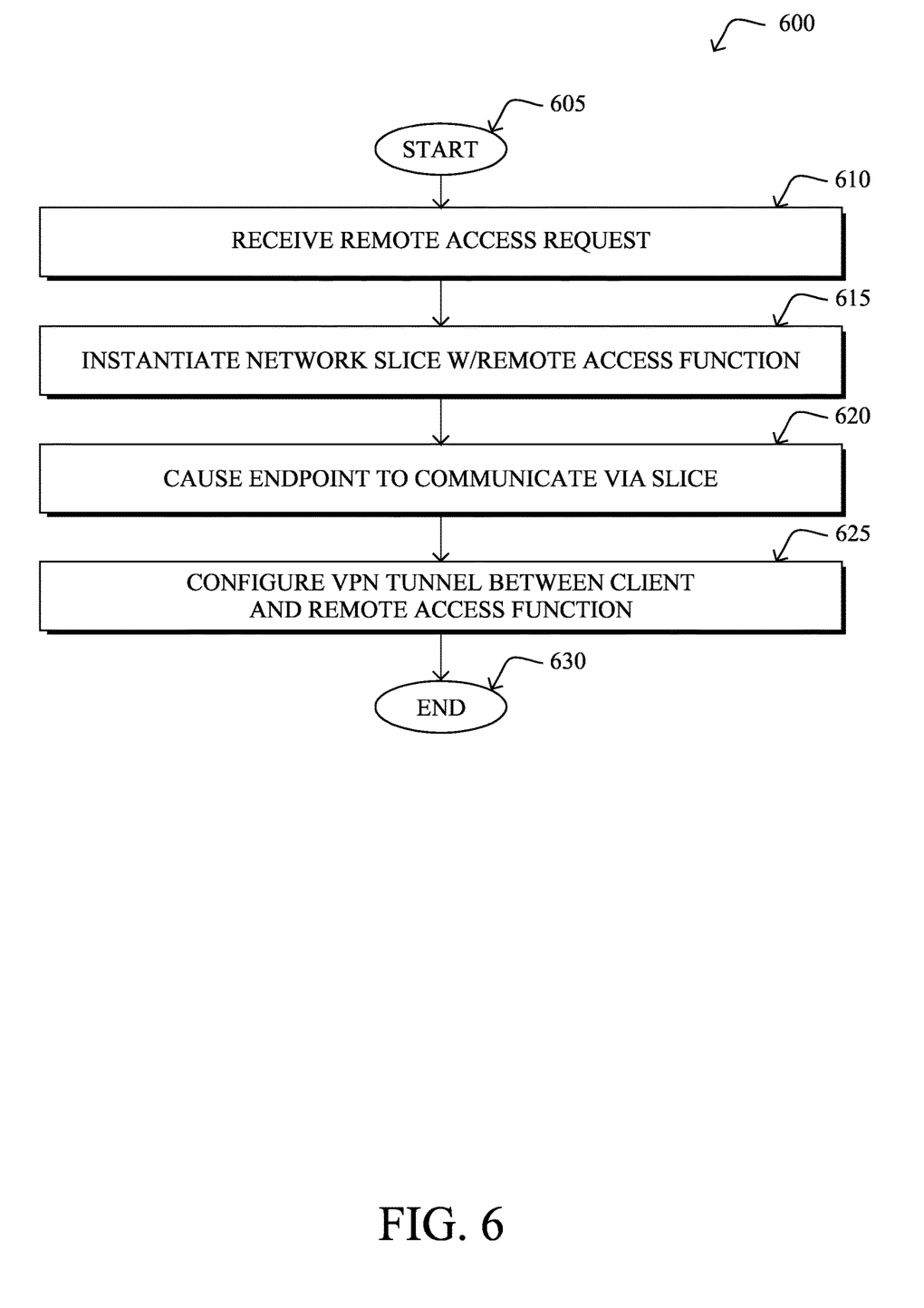
FIG. 6 illustrates an example simplified procedure for providing secure remote access for devices using private cellular connections.

FIG. 6 illustrates an example simplified procedure for providing secure remote access for devices using private cellular connections, in accordance with one or more embodiments described herein. For example, a non-generic, specifically configured device (e.g., device 200), may perform procedure 600 by executing stored instructions (e.g., remote access process 248), such as part of a service that configures remote access to endpoints in a local network. The procedure 600 may start at step 605, and continues to step 610, where, as described in greater detail above, the device may receive a request from a client to remotely access an endpoint in a local network. In some embodiments, the client is associated with a vendor or manufacturer of the endpoint. In further embodiments, the endpoint is a sensor, actuator, or a controller for an actuator or sensor.

At step 615, as detailed above, the device may instantiate a network slice having a remote access function in a cellular network. In some embodiments, the network slice is a dedicated network slice used only to connect the client and the endpoint. In one embodiment, the device may instantiate the network slice sending by a request for a network slice that includes an identifier for the endpoint to the cellular network. In one embodiment, the cellular network is a 5G cellular network.

At step 620, the device may cause the endpoint to communicate a particular type of traffic via the network slice and the remote access function, as described in greater detail above. In some embodiments, the particular type of traffic comprises maintenance data generated by the endpoint or the client. In some embodiments, the device may cause the endpoint to send the particular type of traffic via the network slice and the remote access function by causing the cellular network to instruct the endpoint to communicate the particular type of traffic via the remote access function.

At step 625, as detailed above, the device may configure a virtual private network (VPN) tunnel between the client and the remote access function. In various embodiments, the client and endpoint communicate with one another via a connection that comprises the network slice and the VPN tunnel. In some embodiments, the device may configure the VPN tunnel in part by providing credentials for the tunnel to the client. In another embodiment, the connection is configured to timeout after a threshold amount of time. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the remote access of IoT devices in a secure manner, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   receiving, at a device, a request from a client to remotely access an endpoint in a local network, wherein the endpoint is a sensor, actuator, or a controller for an actuator or sensor;
   instantiating, by the device, a network slice having a remote access function in a cellular network based on an identifier for the endpoint;
   causing, by the device, the endpoint to communicate a particular type of traffic via the network slice and the remote access function; and
   configuring, by the device, a virtual private network tunnel between the client and the remote access function, wherein the client and endpoint communicate with one another via a connection that comprises the network slice and the virtual private network tunnel.

2. The method as in claim 1, wherein the network slice is a dedicated network slice used only to connect the client and the endpoint.

3. The method as in claim 1, configuring the virtual private network tunnel comprises:
   providing, by the device, credentials for the virtual private network tunnel to the client.

4. The method as in claim 1, wherein the particular type of traffic comprises maintenance data generated by the endpoint or the client.

5. The method as in claim 1, wherein instantiating the network slice comprises:

sending, by the device, a request for a network slice that includes the identifier for the endpoint to the cellular network.

6. The method as in claim 1, wherein causing the endpoint to communicate the particular type of traffic via the network slice and the remote access function comprises:
causing the cellular network to instruct the endpoint to communicate the particular type of traffic via the remote access function.

7. The method as in claim 1, wherein the connection is configured to timeout after a threshold amount of time.

8. The method as in claim 1, wherein the client is associated with a vendor or manufacturer of the endpoint.

9. The method as in claim 1, wherein the cellular network is a 5G cellular network.

10. An apparatus, comprising:
one or more network interfaces;
a processor coupled to the one or more network interfaces and configured to execute one or more processes; and
a memory configured to store a process that is executable by the processor, the process when executed configured to:
receive a request from a client to remotely access an endpoint in a local network, wherein the endpoint is a sensor, actuator, or a controller for an actuator or sensor;
instantiate a network slice having a remote access function in a cellular network based on an identifier for the endpoint;
cause the endpoint to communicate a particular type of traffic via the network slice and the remote access function; and
configure a virtual private network tunnel between the client and the remote access function, wherein the client and endpoint communicate with one another via a connection that comprises the network slice and the virtual private network tunnel.

11. The apparatus as in claim 10, wherein the network slice is a dedicated network slice used only to connect the client and the endpoint.

12. The apparatus as in claim 10, wherein the apparatus configures the virtual private network tunnel by:
providing credentials for the virtual private network tunnel to the client.

13. The apparatus as in claim 10, wherein the particular type of traffic comprises maintenance data generated by the endpoint or the client.

14. The apparatus as in claim 10, wherein the apparatus instantiates the network slice by:
sending a request for a network slice that includes the identifier for the endpoint to the cellular network.

15. The apparatus as in claim 10, wherein the apparatus causes the endpoint to communicate the particular type of traffic via the network slice and the remote access function by:
causing the cellular network to instruct the endpoint to communicate the particular type of traffic via the remote access function.

16. The apparatus as in claim 10, wherein the connection is configured to timeout after a threshold amount of time.

17. The apparatus as in claim 10, wherein the client is associated with a vendor or manufacturer of the endpoint.

18. A tangible, non-transitory, computer-readable medium storing program instructions that cause a device to execute a process comprising:
receiving, at the device, a request from a client to remotely access an endpoint in a local network, wherein the endpoint is a sensor, actuator, or a controller for an actuator or sensor;
instantiating, by the device, a network slice having a remote access function in a cellular network based on an identifier for the endpoint;
causing, by the device, the endpoint to communicate a particular type of traffic via the network slice and the remote access function; and
configuring, by the device, a virtual private network tunnel between the client and the remote access function, wherein the client and endpoint communicate with one another via a connection that comprises the network slice and the virtual private network tunnel.

* * * * *